(12) United States Patent
Yoshikaie et al.

(10) Patent No.: US 10,911,630 B2
(45) Date of Patent: Feb. 2, 2021

(54) IMAGE READING APPARATUS

(71) Applicant: SEIKO EPSON CORPORATION, Tokyo (JP)

(72) Inventors: Kazuya Yoshikaie, Kitakyushu (JP); Kazuhiko Arimori, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/160,546

(22) Filed: Oct. 15, 2018

(65) Prior Publication Data

US 2019/0116284 A1    Apr. 18, 2019

(30) Foreign Application Priority Data

Oct. 16, 2017 (JP) .................................. 2017-200456

(51) Int. Cl.
*H04N 1/047* (2006.01)
*H04N 1/00* (2006.01)
*H04N 1/12* (2006.01)

(52) U.S. Cl.
CPC ......... *H04N 1/047* (2013.01); *H04N 1/00636* (2013.01); *H04N 1/12* (2013.01)

(58) Field of Classification Search
None
See application file for complete search history.

(56) References Cited

U.S. PATENT DOCUMENTS

| | | | | |
|---|---|---|---|---|
| 5,010,364 A | * | 4/1991 | Maekawa | G03B 27/6264 271/227 |
| 5,181,705 A | * | 1/1993 | Ueda | B41J 11/42 271/176 |
| 5,848,325 A | * | 12/1998 | Matsumura | G03G 15/507 399/83 |
| 6,206,359 B1 | * | 3/2001 | Hirota | H04N 1/00567 271/270 |
| 2006/0202404 A1 | | 9/2006 | Tokutsu | |
| 2014/0138898 A1 | | 5/2014 | Maeda et al. | |
| 2015/0344258 A1 | * | 12/2015 | Tsumura | B65H 31/02 271/176 |
| 2017/0107072 A1 | | 4/2017 | Nakamura | |
| 2017/0282620 A1 | * | 10/2017 | Samoto | B41J 29/02 |
| 2018/0183949 A1 | * | 6/2018 | Shinohara | H04N 1/00228 |
| 2018/0354739 A1 | * | 12/2018 | Shimmachi | B65H 31/02 |
| 2019/0233241 A1 | * | 8/2019 | Kaneko | B65H 31/20 |

FOREIGN PATENT DOCUMENTS

| | | | |
|---|---|---|---|
| JP | 2006-248783 A | | 9/2006 |
| JP | 2009200677 A | * | 9/2009 |
| JP | 2014-103560 A | | 6/2014 |
| JP | 2017-075040 A | | 4/2017 |

* cited by examiner

*Primary Examiner* — Fan Zhang

(74) *Attorney, Agent, or Firm* — Workman Nydegger

(57) ABSTRACT

An image reading apparatus includes a discharging unit that discharges an original document read by a reading unit to a stacker, in which a controller of the image reading apparatus discharges a first original document at a first transporting speed caused when the original document specified from an original document length measured by the measuring unit is the first original document and discharges a second original document at a second transporting speed slower than the first transporting speed caused when the original document is the second original document longer than the first original document.

17 Claims, 6 Drawing Sheets

IMAGE READING APPARATUS

BACKGROUND

1. Technical Field

The present invention relates to an image reading apparatus which has a transporting function of transporting an original document and a reading function of reading an image from an original document while being transported and includes a stacker for receiving the original document discharged after being read.

2. Related Art

In JP-A-2014-103560, an image reading apparatus which supplies a plurality of original documents set therein one by one and reads an image from the original document while being transported is disclosed. In the image reading apparatus, in a case where the original document is an original document in a first original document type of which a length thereof is a length equal to or more than a first transporting distance between a supplying roller and a first transporting roller along a transporting path and is shorter than a second transporting distance between the supplying roller and a second transporting roller along the transporting path, a transporting speed of the original document at a separating timing when the original document is separated from the supplying roller is delayed so as to read the original document. Therefore, since the original document is released due to a deterrent force received from the supplying roller so far at the time of being separated from the supplying roller, increasing of the transporting speed of the original document is instantaneously avoided, and a region where a part of the original document cannot be read is prevented from being generated.

In this type of the image reading apparatus, there is an image reading apparatus including a medium receiving tray (example of stacker) for receiving an original document, which is discharged from a discharging port after being read, in a stacked state (for example, JP-A-2017-75040). The medium receiving tray has an expansion and contraction structure, and thus a user uses the medium receiving tray by extending and contracting so as to have a length in accordance with a size of the original document and adjusting the length thereof to be a needed length. In addition, a rotary type stopper is provided in a distal end portion of the medium receiving tray.

For example, in a case in which the original document in A4 size is read, the medium receiving tray extends to an A4 size length, and a stopper in the distal end portion is rotated to be set up. A leading edge of the read original document comes into contact with the stopper at the time of being discharged so that the original document is stacked on the medium receiving tray in an arranged state.

However, in this type of the image reading apparatus, in a case in which an original document having a size greater than a size corresponding to the medium receiving tray is read, the original document being discharged onto the medium receiving tray is longer than the medium receiving tray, and thus the original document is stacked in a state in which a leading edge thereof is hung from the distal end of the medium receiving tray by a predetermined length without setting up the stopper.

However, in the image reading apparatus disclosed in JP-A-2014-103560 and JP-A-2017-75040, a discharging speed of the original document when the original document after being read is discharged from the discharging port is a constant speed which is determined in accordance with a reading resolution regardless of the original document size (original document length). Also, since the original document (example of first original document) in a reference size comes into contact with the stopper in the distal end of the medium receiving tray, the original document is stacked in a state of being arranged on the medium receiving tray. Meanwhile, for example, since an original document (example of second original document) longer than the medium receiving tray is used without setting up the stopper of the medium receiving tray, and a position thereof is not regulated by coming into contact with the stopper, there is a problem that the original document is not arranged on the medium receiving tray in a state in which a part thereof is hung down from the distal end of the medium receiving tray and is stacked in a relatively disassembled state. Therefore, it is desirable that the original document longer than the medium receiving tray can be stacked on the medium receiving tray in a relatively arranged state.

SUMMARY

An advantage of some aspects of the invention is to provide an image reading apparatus capable of discharging an original document in an arranged state on a stacker even when the original document is relatively long in a discharging direction.

Hereinafter, means of the invention and operation effects thereof will be described.

According to an aspect of the invention, there is provided an image reading apparatus including a transporting unit that transports an original document, a reading unit that reads an image of the original document, a measuring unit that measures a length of the original document, a discharging unit that discharges the original document after being read by the reading unit, a stacker that receives the discharged original document, and a controller that controls the transporting unit and the discharging unit, in which the controller causes a first original document to be discharged at a first transporting speed when the original document being specified from an original document length measured by the measuring unit is the first original document, and causes a second original document to be discharged at a second transporting speed slower than the first transporting speed caused when the original document is the second original document longer than the first original document.

In this configuration, the first original document is discharged to the stacker at the first transporting speed, and the second original document longer than the first original document is discharged to the stacker at the second transporting speed slower than the first transporting speed. As a result, even when the original document is relatively long in the discharging direction, it is possible to discharge the original document in a state of being arrayed on the stacker.

In the image reading apparatus, it is preferable that the controller cause the second original document to be transported at a reading speed while the reading unit reads the second original document in a case in which the original document is the second original document based on a measured result of the measuring unit, and decelerate a transporting speed of the second original document to the second transporting speed from the reading speed caused when reading by the reading unit is completed.

In this configuration, the second original document is read at an appropriate reading speed in the same manner as the first original document, and thus it is possible to discharge the original document in a state of being arrayed on the stacker.

In the image reading apparatus, it is preferable that the transporting unit and the discharging unit include a common power source, and in which, in a case in which a preceding original document which is precedently fed is the second original document, after the second original document passes through the discharging unit, the controller increases the speeds of the transporting unit and the discharging unit, and after the speeds of the transporting unit and the discharging unit reach the reading speed caused when the reading unit reads the original document from the second transporting speed caused when the second original document is discharged, the controller controls a feeding start timing of a succeeding original document so that the succeeding original document which is fed subsequent to the preceding original document is started to be read.

In this configuration, in a case in which the preceding original document is the second original document, after the second original document passes through the discharging unit, the speeds of the transporting unit and the discharging unit are increased, and after the transporting unit and the discharging unit reach the reading speed caused when the reading unit reads the original document from the second transporting speed caused when the second original document is discharged, the feeding start timing of the succeeding original document is controlled so that the succeeding original document is started to be read. That is, in a case in which the preceding original document is the second original document, the feeding start timing of the succeeding original document is delayed, as the starting speed at the time of increasing the speed from a driving speed of the power source at the time of discharging the preceding original document is delayed when compared to a case in which the preceding original document is the first original document. Therefore, even when the discharging speed is delayed when the preceding original document is the second original document, it is possible to start to read the succeeding original document by the reading unit at an appropriate reading speed faster than the second transporting speed.

In the image reading apparatus, it is preferable that, in a case in which the preceding original document is the second original document, the feeding start timing of the succeeding original document be delayed, compared to a case in which the preceding original document is the first original document.

In this configuration, even when the second original document is discharged at the second transporting speed slower than the first transporting speed in a case in which the preceding original document is the second original document, the feeding start timing of the succeeding original document is delayed when compared to a case in which the preceding original document is the first original document. Therefore, regardless of that the preceding original document is the first original document or the second original document, it is possible to start to read the succeeding original document at an appropriate reading speed.

In the image reading apparatus, it is preferable that a feeding unit that feeds and delivers the original document to the transporting unit be further included, in which the controller control the feeding unit and accelerates a feeding speed to a second feeding speed from a first feeding speed after the original document is fed at the first feeding speed, and, in a case in which the preceding original document is the second original document, the controller delay an acceleration timing for accelerating the succeeding original document to the second feeding speed from the first feeding speed, compared to a case in which the preceding original document is the first original document.

In this configuration, in a case in which the preceding original document is the second original document, since the transporting speed at the time of discharging the second original document is set to the second transporting speed slower than the first transporting speed when the preceding original document is the first original document, it is possible to avoid an excessive speed difference between the transporting unit including a power source common to the discharging unit and the feeding unit, and to smoothly deliver the succeeding original document to the transporting unit from the feeding unit.

In the image reading apparatus, it is preferable that the controller cause a third original document to be discharged at the second transporting speed, when the original document is the third original document having a length shorter than that of the first original document.

In this configuration, when the original document being specified from the length of the original document measured by the measuring unit is the third original document having a length shorter than that of the first original document, the original document is discharged at the second transporting speed in the same manner as the second original document. As a result, it is possible to load the third original document on the stacker with good array properties. For example, when a length of the stacker can be adjusted, in a case in which the plurality of original documents in which the first original document and the third original document are mixed is read, it is possible to load the third original document on the stacker with the first original document with good array properties even when the length of the stacker matches with a length of the first original document.

In the image reading apparatus, it is preferable that the stacker include a placing unit that is capable of adjusting the length of the original document within a predetermined length range of which the length of the original document in a discharging direction is longer than the first original document and is shorter than the second original document, and a stopper that is provided to be movable to a regulation position and a retraction position in a leading edge of the original document at the placing unit in the discharging direction and regulates further movement of the original document in the discharging direction by coming into contact with the leading edge of the original document in the discharging direction.

In this configuration, if the original document is the second original document, the original document is discharged by the discharging unit at the second transporting speed slower than the first transporting speed when the original document is the first original document. The second original document longer than the first original document is discharged onto the stacker in a state in which the leading edge exceeds the stopper of the stacker so as to be dropped. At this time, since the second original document is discharged at the second transporting speed slower than the first transporting speed, it is possible to array and load the original document in a state of being dropped from the distal end of the stacker. For example, it is possible to efficiently suppress falling of the second original document to the distal end of the stacker.

In the image reading apparatus, it is preferable that the controller detect the length of the original document in each sheet in a reading job for reading a plurality of the original documents, and switch a transporting speed caused when the discharging unit discharges the original document between the first transporting speed and the second transporting speed in accordance with the length of the original document in each the original document.

In this configuration, when the plurality of original documents is read, since the length of the original document is measured in each sheet, and the transporting speed at the time of discharging each original document is adjusted in accordance with the length of the original document, and for example, even when the plurality of original documents having different original document lengths is mixed, after the plurality of original documents is read, it is possible to load the plurality of original documents in a state of being arrayed on the stacker.

In the image reading apparatus, it is preferable that a power source that is capable of supplying a power for adjusting a length of the stacker be further included, in which the controller changes the length of the stacker in accordance with the length of the original document measured by the measuring unit.

In this configuration, the length of the stacker is changed in accordance with the length of the original document. Accordingly, even when the original document is the second original document, it is possible to suppress falling from the stacker to a distal end side.

In the image reading apparatus, it is preferable that a sensor that detects whether or not the stopper provided in the distal end portion of the stacker is present at the regulation position or the retraction position and a notification unit that is capable of performing notification with respect to a user with a display or a voice be further included, in which, when the sensor detects whether or not the stopper is present at the regulation position, and the measuring unit detects the second original document, the controller stops reading of the second original document and causes the notification unit to notify a message for urging the stopper to be moved to the retraction position.

In this configuration, in a case in which the stopper is present at the regulation position, and the original document is the second original document, the second original document is stopped to be transported, and the notification unit notifies an instruction for urging the stopper to move to the retraction position. Accordingly, when a reading operation of the second original document is started in a state in which the stopper of the stacker is present at the regulation position as it is, it is possible to avoid a situation where the array properties worsen because the original document comes into contact with the stopper before happens.

In the image reading apparatus, it is preferable that a feeding unit that is capable of placing a plurality of the original documents be further included, in which the feeding unit sequentially feeds the original documents from the original document placed on a lower side.

In this configuration, the feeding unit sequentially feeds the original documents from the original document placed on the lower side. Accordingly, it is possible to load the original document on the stacker in the same as an order from the original document set for being fed by the feeding unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of an image reading apparatus will be described with reference to drawings.

Figure 1:
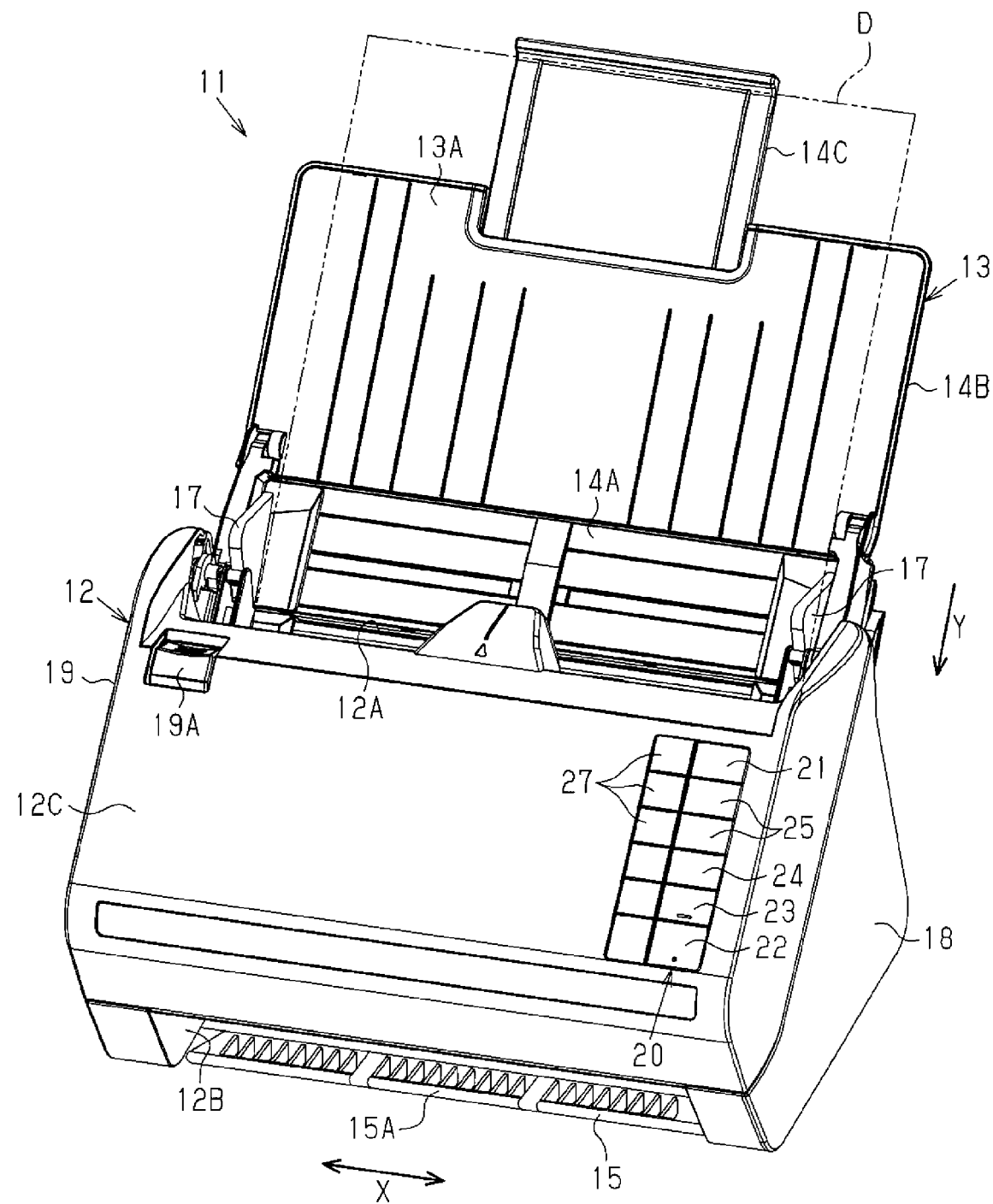
FIG. 1 is a perspective view illustrating an image reading apparatus in an embodiment.

As illustrated in FIG. 1, an image reading apparatus 11 of the embodiment includes an apparatus main body 12 (hereinafter, simply referred to as "main body 12") having a substantial trapezoidal shape when seen from the side and an original document support 13 including a placing surface 13A on which an original document D which is a target image to be read is placed (set). The original document D placed on the original document support 13 is transported one by one into the main body 12 from a feeding port 12A opened to an upper portion of the main body 12. The fed original document D is transported inside the main body 12 along a predetermined transporting path 29 (refer to FIG. 2), an image on the original document is read at a reading position while being transported, and then the original document is discharged from a discharging port 12B opened to a front side lower portion of the main body 12 so as to be loaded on a stacker 15 (for example, discharging tray) as illustrated in FIG. 2.

The original document support 13 includes a first support unit 14A in which a base end portion (lower end portion) is rotatably connected to the main body 12 and a second support unit 14B in which a base end portion is rotatably connected to a distal end portion of the first support unit 14A. A slide type auxiliary support unit 14C is retractably provided on the distal end portion of the second support unit 14B. The original document support 13 can be disposed at an opening position (use position) illustrated in FIG. 1 constituting a planar placing surface 13A which obliquely extends upwardly on a rear side of the main body 12 so as to be capable of placing the original document D thereon, and at a closed position (accommodating position) which is rotated in a paper surface front direction of FIG. 1 from the opening position by a user so as to covers an upper surface portion and a front surface portion 12C of the main body 12.

A pair of edge guides 17 capable of sliding in a width direction X intersecting (particularly, orthogonal to) a transporting direction Y where the original document D is transported is provided in the original document support 13. The original document D loaded on the placing surface 13A is pinched between the pair of edge guides 17 so as to be positioned in the width direction X with respect to the feeding port 12A. Also, when the image reading apparatus 11 reads an image of the original document D, the width direction X indicates a main scanning direction and the transporting direction Y indicates a sub scanning direction.

Figure 2:
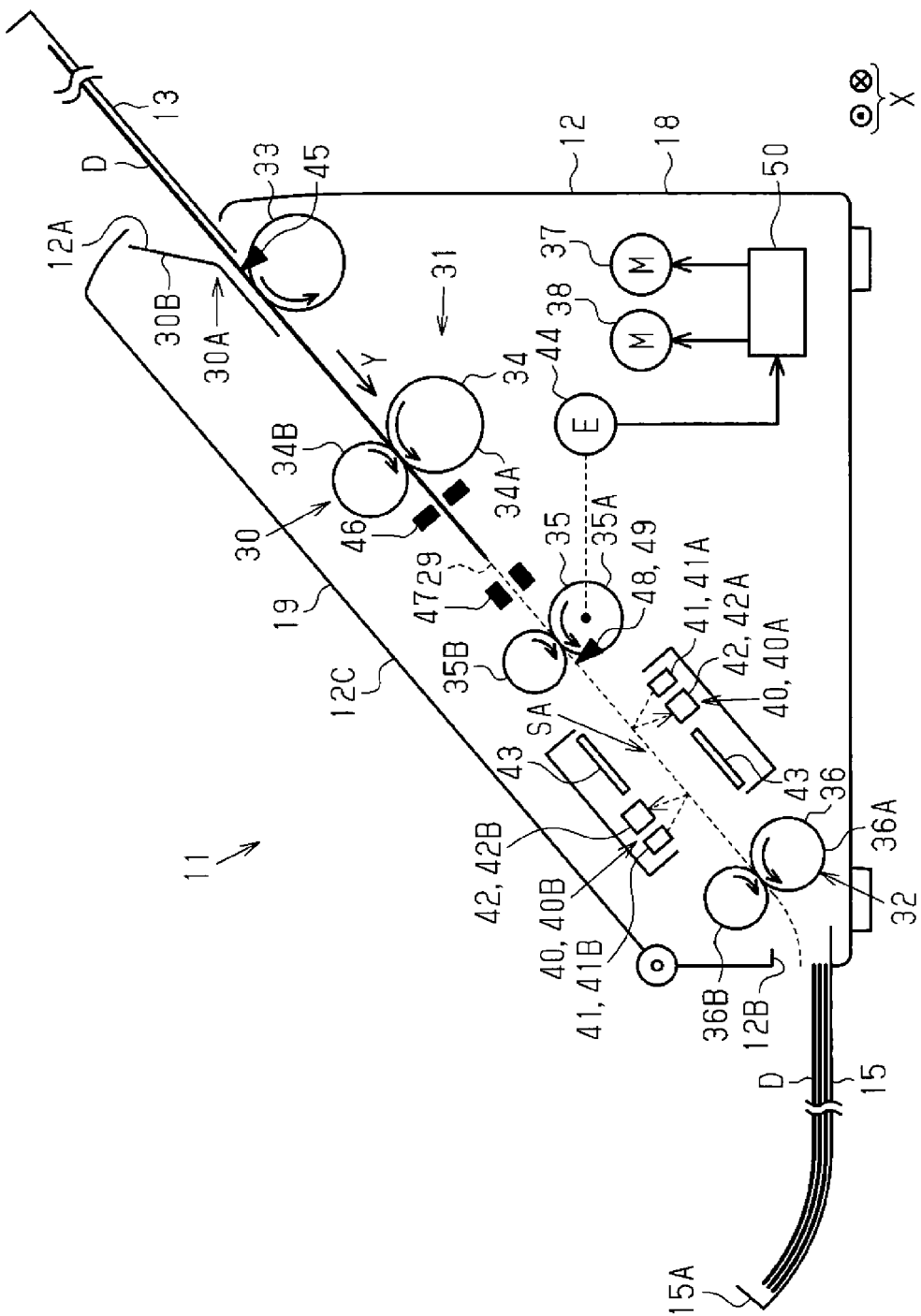
FIG. 2 is a schematic side sectional view illustrating the image reading apparatus.

As illustrated in FIGS. 1 and 2, the main body 12 includes a main body unit 18 and a cover unit 19 which is connected to the main body so as to be rotatable based on a front end portion of the main body unit 18. In a state in which the cover unit 19 is disposed on the closed position as illustrated in FIGS. 1 and 2, as illustrated in FIG. 2, the transporting path 29 (transporting path) extending from the feeding port 12A to the discharging port 12B is formed between the main body unit 18 and the cover unit 19. When the user operates an operating unit 19A illustrated in FIG. 1 so as to unlock the cover unit 19 and rotates the cover unit 19 from the closed position illustrated in FIG. 1 to the opening position on a paper surface front side of FIG. 1 based on the front end portion of the cover unit, the transporting path 29 becomes exposed, and removal of a paper jam of the original document D, maintenance of a roller 33 and pairs of rollers 34 to 36 (refer to FIG. 2) for feeding and transporting the paper, or the like, is performed. In addition, as illustrated in FIG. 1, the stacker 15 is accommodated on a lower side of the discharging port 12B so as to be slidable in a front and rear direction in the main body unit 18. A user uses the stacker 15 by sliding forward and elongating the stacker from an accommodated state illustrated in FIG. 1. At this time, the stacker 15 elongates as a length corresponding to a length of the original document D. In addition, a rotary type stopper 15A for arraying the original document D by coming into contact with a leading edge of the original document D having a predetermined size loaded on the stacker 15 is provided the distal end portion of the stacker 15.

As illustrated in FIG. 1, an operating unit 20 is provided on the front surface portion 12C of the main body 12 (cover unit 19). The operating unit 20 includes a plurality of switches 21 to 25 for operation which is operated by a user at the time of giving an instruction to the image reading apparatus 11. For further information, the operating unit 20 includes a power source switch 21, a start switch 22, a stop switch 23, a mode selecting switch 24, a switch 25 having functions other than those of switches described above, and the like. For example, a notification unit 27, which is capable of performing at least either of lighting and blinking and turning-off using LED or the like, or is formed of a displaying light in which a lighting color at the time of lighting can be changed, is provided at a position in contact with the operating unit 20. The notification unit 27, for example, notifies information necessary for a user, such as turning-on and off of a power source, a mode which is currently selected, and the like, by turning-on or off the light, or changing a color of lighting. Also, a display unit (illustration is omitted) constituted by, for example, a liquid crystal panel or the like may be provided in a predetermined location in the front surface portion 12C of the main body 12 illustrated in FIG. 1, and necessary information may be notified by being displayed on the display unit.

As illustrated in FIG. 2, a transporting mechanism 30, which transports the original document D, and a reading unit 40 are provided inside the main body 12 of the image reading apparatus 11. The transporting mechanism 30 includes a feeding unit 30A which guides and feeds a plurality of original documents D loaded (set) on the original document support 13 one by one into the main body 12, a transporting unit 31 which transports the fed original document D along the transporting path 29 so as to pass through a reading region SA, and a discharging unit 32 which discharges the original document D after an image thereon is read while being transported by the transporting unit 31.

The feeding unit 30A includes the original document support 13 described above, which is capable of setting the plurality of original documents D in a loaded state, and one feeding roller 33 (pick-up roller) facing a feeding guide 30B on an upper stream end position of the transporting path 29 inside the main body 12. The feeding unit 30A feeds the plurality of original documents D loaded on the original document support 13 one by one from the feeding port 12A along the feeding guide 30B. The transporting unit 31 includes a pair of feeding rollers 34 disposed at a position on a lower stream side of the feeding roller 33 in the transporting direction Y and a pair of transporting rollers 35 disposed at a position on an upper stream side of the reading region SA in the transporting direction Y. The discharging unit 32 includes a pair of discharging rollers 36 disposed at a position on a lower stream side of the reading region SA in the transporting direction Y. Also, the pair of discharging rollers 36 also transports the original document D with the pair of transporting rollers 35 while the original document is read.

A plurality of rollers 33 and 34A in a feeding system is rotary driven by power of a feeding motor 37 which is a power source thereof. In addition, a separating roller 34B in a feeding system and driving rollers 35A and 36A constituting the pair of rollers 35 and 36 in a transporting system are rotary driven by power of a transporting motor 38 which is a power source thereof. The plurality of original documents D loaded on the original document support 13 is fed from the feeding port 12A into the main body 12 in an order from the lowest original document one by one by the feeding roller 33. Such a feeding unit 30A (rollers 33, 34A, and the like) are driven by the feeding motor 37 as a power source, and the transporting unit 31 (pair of feeding rollers 34 and the like) and the discharging unit 32 (pair of discharging rollers 36 and the like) are driven by the transporting motor 38 as a common power source thereof.

The pair of feeding rollers 34 is constituted by the driving roller 34A and the separating roller 34B (retard roller). The separating roller 34B has a friction coefficient of an outer circumferential surface with respect to the original document D which is greater than that of the driving roller 34A, and is rotated at a slightly lower speed than a rotation speed of the driving roller 34A. A difference between friction coefficients of outer circumferential surfaces of both rollers 34A and 34B and a rotational speed difference therebetween are used, even if a plurality of the original documents D is overlapped with each other so as to be double-fed from the feeding roller 33, the pair of the feeding rollers 34 separates and feeds one lowest original document to a lower stream side in the transporting direction Y. Also, a movable type feeding mechanism including the feeding guide 30B is provided in the feeding port 12A. This feeding mechanism is driven in conjunction with the feeding roller 33 by the power of the feeding motor 37 and is operated as follows. A feeding path is opened in a process in which the original document D is fed to the feeding port 12A, the original document D in a set state is pressed to an outer circumferential surface of the feeding roller 33, the original document D is sent to the feeding port 12A, and then the feeding mechanism closes the feeding path in order to prevent a succeeding original document from being interrupted. Accordingly, the original documents D are fed one by one by the feeding roller 33.

In addition, the pairs of rollers 35 and 36 are constituted by the driving rollers 35A and 36A and driven rollers 35B and 36B. The pairs of rollers 35 and 36 are rotary driven so as to transport the original document D at a transporting speed (reading speed) same as a speed at the time of reading the original document D. Each of the driven rollers 35B and 36B is rotated by following the rotation of the driving rollers 35A and 36A which respectively becomes a pair with the driven roller. Also, the original document D such as a brochure original document or a new original document is set in the original document support 13 by being pinched between a carrier sheet (illustration is omitted) which is a transparent film having a size corresponding to two sheets of the original documents and in which the transparent film is attached to a part of a peripheral part thereof, and the pinched original document is transported in each carrier sheet, and thereby it is possible to read such a type of the original document D.

As illustrated in FIG. 2, the reading unit 40 which reads an image of the original document D being transported along the transporting path 29 is provided inside the main body 12. A pair of the reading units 40 is provided on both sides where the transporting path 29 is pinched at a position between the two pairs of transporting rollers 35 and 36 in the transporting direction Y. The pair of the reading units 40 is constituted by a first reading unit 40A reading a front surface (lower surface) of the original document D and a second reading unit 40B reading a rear surface (upper surface) of the original document D, and the reading units are disposed at positions slightly deviated from each other in the transporting direction Y. The pair of the reading units 40 is constituted by a light source 41 capable of irradiating the original document D while being transported with light and an image sensor 42 extending in the main scanning direction (width direction X). In a general reading mode, only the first reading unit 40A performs a reading operation so as to read the front surface of the original document D, and in a double-side reading mode, both the first reading unit 40A and the second reading unit 40B perform the reading operation at the same time so as to read both surfaces (front and rear surfaces) of the original document D.

The light source 41 is constituted by, for example, an LED, a fluorescent lamp, or the like. The image sensor 42 receives reflection light of which light emitted from the light source 41 is reflected to the original document D and converts the received light into an electrical signal so as to output a pixel signal of a value corresponding to a received amount of the light. The image sensor 42 is, for example, a linear image sensor. The image reading apparatus 11 is capable of performing color scanning and monochrome scanning (gray scale scanning). Also, hereinafter, there is a case that the light source 41 and the image sensor 42 are respectively referred to as a first light source 41A and a first image sensor 42A when indicating indicate a first reading unit 40A side, and are referred to as a second light source 41B and a second image sensor 42B when indicating a second reading unit 40B side.

Further, a color reference plate 43 is disposed at a position where the transporting path 29 is pinched between the image sensors 42 facing each other. The color reference plate 43 is provided to obtain a white reference value for shading-correction, and a white reference plate expressed by white or a gray reference plate expressed by gray is used. In a case of the gray reference plate, the plate is read as a background (gray background) of the original document and is also used for detecting a position or a region of the original document D. Also, in a case in which a sensor for detecting an original document region is provided separately, the color reference plate 43 is preferably the white reference plate.

The image sensor 42 is, for example, a contact type image sensor in which a plurality of photoelectric conversion elements are disposed in a row along the main scanning direction X. Further, the image sensor 42 is, specifically, a complementary metal oxide semiconductor (CMOS) image sensor. The image sensor 42 photoelectric-converts light received by each photoelectric conversion element so as to output a pixel signal of a value corresponding to a received amount of the light.

In addition, as illustrated in FIG. 2, an encoder 44 (for example, rotary encoder) capable of detecting rotation of one driving roller in a transporting system among the plurality of pairs of rollers 34 to 36 is provided inside the main body 12. The encoder 44 outputs a detecting signal including pulses having the number thereof proportional to a rotation amount of the driving roller. The detecting signal of the encoder 44 is input to a controller 50 disposed inside the main body 12, and the controller 50 is used for grasping a position (transporting position) of the original document D (including carrier sheet) while being transported and grasping the transporting speed.

The controller 50 illustrated in FIG. 2 controls the image reading apparatus 11 based on an operation signal from the operating unit 20 (refer to FIG. 1) operated by a user or a reading instruction applied by a reading job from a host device 100 described later. The controller 50 controls the feeding motor 37, the transporting motor 38, and the reading units 40 (40A and 40B) at the time of a reading control.

As illustrated in FIG. 2, in order from an upstream side in the transporting direction Y, the feeding roller 33, the pair of the feeding rollers 34, and the pairs of rollers 35 and 36 are respectively disposed and are arranged in pairs with an interval respectively in the width direction X. The original document sensor 45 detecting presence and absence of the original document D set in the original document support 13 is disposed between the pair of feeding rollers 33. The original document sensor 45 is, for example, a contact type sensor including a lever and is turned on when the set original document D presses the lever if the original document D is set in the original document support 13.

The controller 50 resets a transportation counter 81 based on a turning-on signal of the original document sensor 45 when the original document D is set at a feeding position, and grasps the transporting position which is a position of a transporting target in the transporting direction Y based on a countable number of values in which the number of pulses or pulse edges of the detecting signal being input from the encoder 44 during driving of the transporting motor 38 are counted by the transportation counter 81.

As illustrated in FIG. 2, the carrier sheet sensor 46 (hereinafter, also referred to as "CS sensor 46") is provided at the position between the pair of the feeding rollers 34 and the pair of transporting rollers 35 in the transporting direction Y. The CS sensor 46 is an optical sensor, includes a light emitter and a light receiver on both sides pinching a transporting path therebetween, and detects an opacity part such as a mark of the original document D or the carrier sheet.

Further, a double-feeding sensor 47 which detects double-feeding of the original document D is disposed at the position between the driving rollers 34A and 35A in the transporting direction Y. The double-feeding sensor 47, for example, is an ultrasonic sensor, and includes a transmitter which is capable of transmitting ultrasonic waves and a receiver which is disposed at a position facing the transmitter with the transporting path 29 pinched therebetween and receives the ultrasonic waves. Also, in this example, when the CS sensor 46 detects the carrier sheet, in order to avoid a double-feeding detection error, the double-feeding detection is invalid based on the detecting signal of the double-feeding sensor 47.

In addition, the original document presence and absence sensor 48 capable of detecting presence and absence of the original document D is disposed at a position on a slight downstream side of a nipping point of the pair of transporting rollers 35 in the transporting direction Y. The original document presence and absence sensor 48 is, for example, a contact type sensor including a lever (contactor). The original document presence and absence sensor 48 detects the original document D when the leading edge of the original document D presses the lever so as to be turned on, and if a trailing edge of the original document D passes through so as not to press the lever, the original document presence and absence sensor does not detect the original document D so as to be turned off. Accordingly, the controller 50 detects passing of the leading edge of the original document D through the pair of transporting rollers 35 and passing of the trailing edge of the original document D through the pair of transporting rollers 35 based on the detecting signals (ON/OFF) of the original document presence and absence sensor 48. A measured result of which the original document presence and absence sensor 48 detects the leading edge and the trailing edge of the original document D is used for a control of determination of timings when a reading operation of the reading units 40 (40A and 40B) is started and finished. In addition, since the original document presence and absence sensor 48 is capable of detecting the leading edge and the trailing edge of the original document D, the original document presence and absence sensor constitutes a measuring unit 49 which detects a length in the transporting direction Y of the original document D based on a transported distance of the original document D from detecting the leading edge of the original document D to detecting the trailing edge thereof, that is, a size of the original document determined based on the length. Also, the original document presence and absence sensor 48 may be a non-contact type sensor such as an optical sensor.

Figure 3:
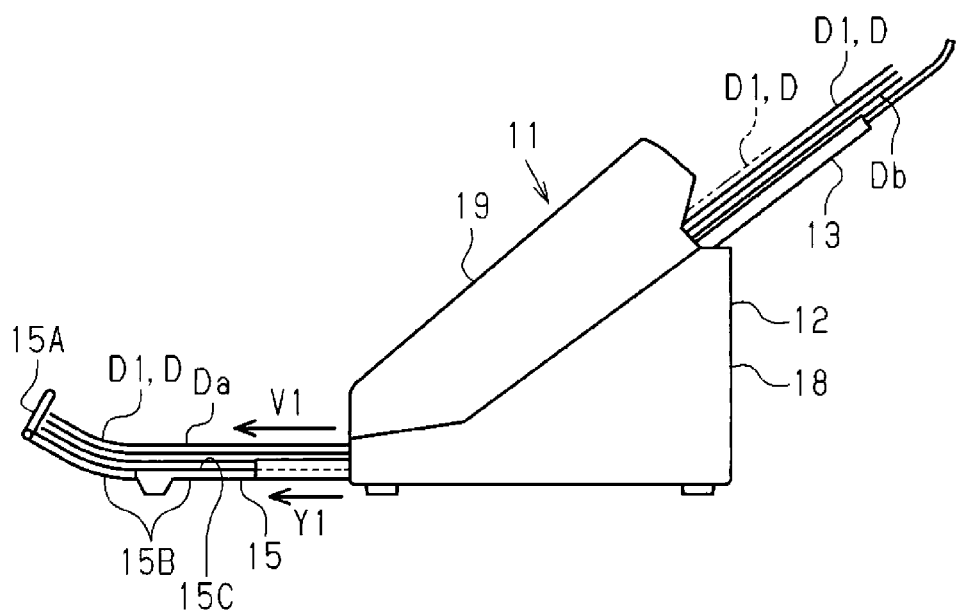
FIG. 3 is a schematic side view illustrating the image reading apparatus at the time of reading a first original document.

As illustrated in FIG. 3, the stacker 15 is a slide type stacker having a structure in which a plurality of tray members 15B is slidably connected thereto, and can be taken out so that a length thereof is adjusted by stages by being slid to the outside (discharging direction Y1) from an accommodated position illustrated in FIG. 1. A length of the stacker 15 can be adjusted by the plurality of tray members 15B, and the stacker includes a placing unit 15C on which the original document D discharged from the discharging port 12B (refer to FIG. 1) is placed and the rotary type stopper 15A provided on the distal end portion of the placing unit 15C in the discharging direction Y1. The length of the stacker 15 is adjusted according to the size of the original document D by a user when the stacker is used. As illustrated in FIG. 3, the stacker 15 elongates in a curved surface shape in which a part close to the distal end is obliquely curved upward.

As illustrated in FIG. 3, if the original document is a first original document D1, the stacker 15 elongates by a slightly shorter length than the maximum length so as to be used and is disposed at a regulation position in which the stopper 15A on the distal end portion of the stacker comes into contact with the leading edge of the original document D and becomes a stand-up posture capable of regulating movement of the stopper in the discharging direction Y1 by the length of the original document D or more. Therefore, the first original document D1 discharged at the first transporting speed V1 is loaded on the stacker 15 in an arranged state when the leading edge thereof comes into contact with the stopper 15A. Also, FIG. 3 illustrates a state in which a third original document D3 illustrated by a two-dot chain line in this drawing, which is shorter than the first original document D1 in the discharging direction Y1, is set in the original document support 13 in a state of being mixed with the first original document D1.

Figure 4:
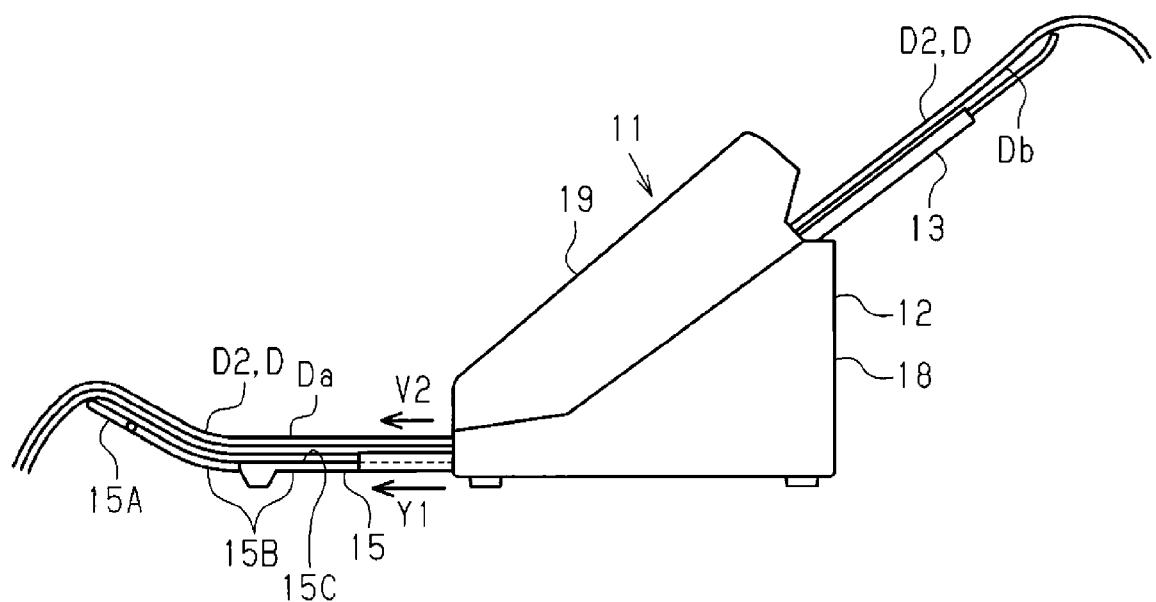
FIG. 4 is a schematic side view illustrating the image reading apparatus at the time of reading a second original document.

In addition, as illustrated in FIG. 4, regarding a second original document D2 having a longer length in the discharging direction Y1 than the length of the placing unit 15C in the discharging direction Y1 in a state in which the stacker 15 elongates by the maximum length, the stopper 15A cannot be used. Therefore, when the second original document D2 is read, as illustrated in FIG. 4, the stopper 15A is used in a state of the retraction position where a tilted posture of which the stopper is tilted to the outside (discharging direction Y1 side) is set. At this time, as illustrated in FIG. 4, the second original document D2 discharged onto the stacker 15 is dropped at a degree at which the second original document does not touch a bottom surface or an installation surface such as a surface of a desk from a distal end of the stopper 15A at the retraction position (tilting posture) on the distal end portion of the stacker 15. However, if the second original document D2 is discharged onto the stacker 15 in which the stopper 15A is at the retraction position at the first transporting speed V1 same as that of the first original document D1, array properties of the second original document D2 on the stacker 15 is deteriorated due to a force at the time of being discharged, and there is a concern that the second original document may be fallen from the distal end of the stacker 15 to the discharging direction Y1 side in some cases. Therefore, in the image reading apparatus 11 of the embodiment, when the original document D is the second original document D2, the second original document D2 is discharged at the second transporting speed V2 slower (at a slow speed) than the first transporting speed V1 when the first original document D1 is discharged.

In addition, in FIGS. 3 and 4, the original document D which is preferentially transported and read is a preceding original document Da, and the original document D which is transported and read subsequently to the preceding original document Da is a succeeding original document Db. In the embodiment, in a case in which the preceding original document Da is the second original document D2 being discharged at the second transporting speed V2 slower than the first transporting speed V1, when considering that a timing of a finish of discharging is delayed due to a speed difference thereof at the time of discharging the original documents, a feeding start timing of the succeeding original document Db is delayed to be slower than that in a case in which the preceding original document Da is the first original document D1. Therefore, after the preceding original document Da is finished to be discharged from the discharging unit 32 (pair of discharging rollers 36 illustrated in FIG. 2), even when the transporting motor 38 is accelerated from a driving speed which is a slow speed at the time of the second transporting speed V2, the transporting unit 31 is accelerated to the reading speed (first transporting speed V1) to match with reaching a reading start position of the succeeding original document Db.

Figure 5:
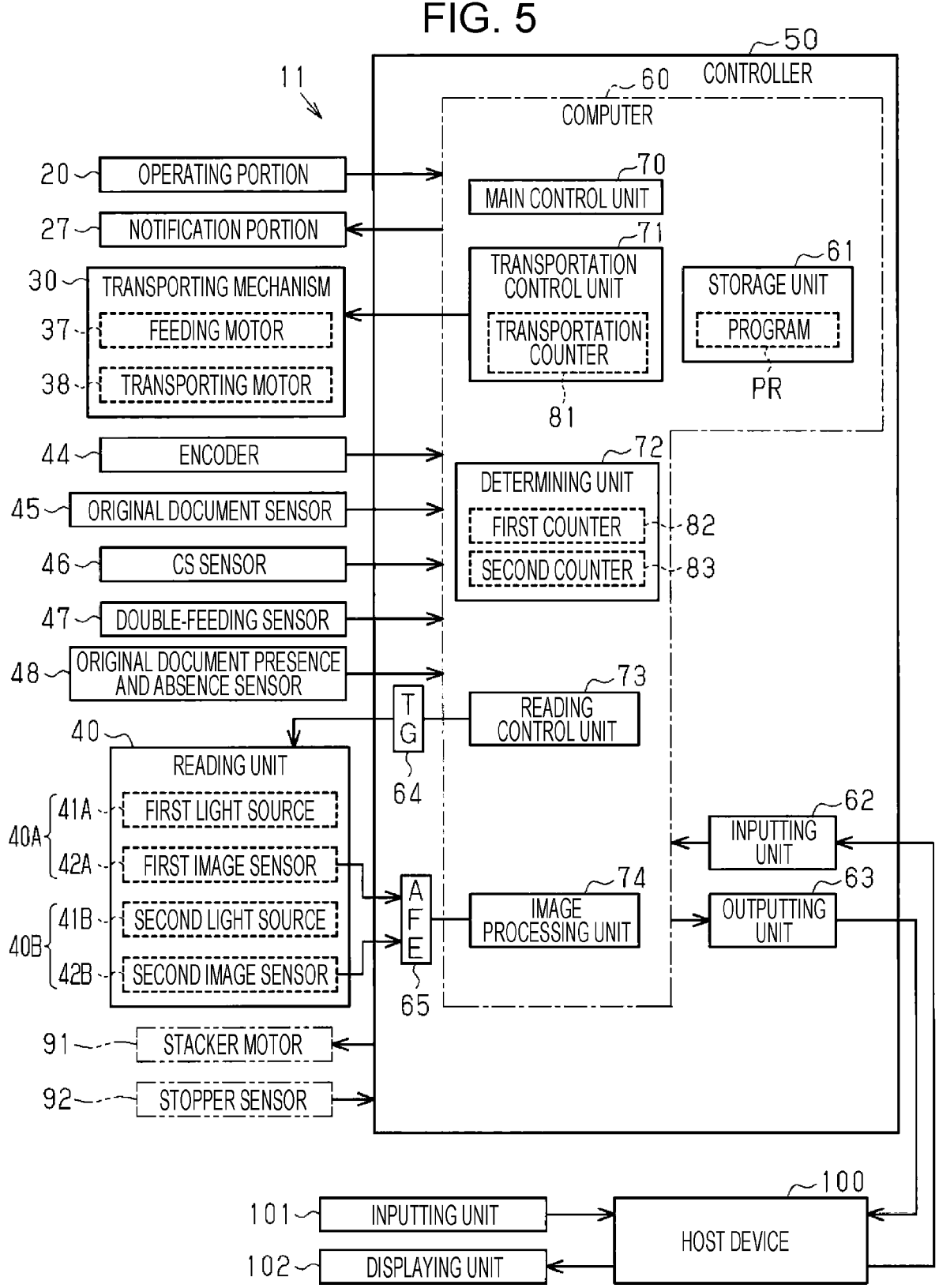
FIG. 5 is a block diagram illustrating an electrical configuration of the image reading apparatus.

Next, with reference to FIG. 5, an electrical configuration of the image reading apparatus 11 will be described. As illustrated in FIG. 5, the image reading apparatus 11 is connected to the host device 100 through a communication cable. The host device 100 is, for example, a personal computer (hereinafter, also referred to as "PC"), and includes an inputting unit 101 and a display unit 102 which are electrically connected to the main body. The host device 100 includes a reading driver constituted by software having a function of instructing reading to the image reading apparatus 11 therein because a program for the reading driver is installed. Also, the host device 100 is not limited to a PC and may be a smart device such as personal digital assistants (PDA), a tablet PC, or a smartphone.

A user operates the operating unit 20 or the inputting unit 101 of the host device 100 and sets a setting condition relating to an image reading process. The setting condition includes a reading condition including read resolutions, read colors, or single-side reading and double-side reading, an image processing condition including shading correction, gamma correction, or the like, and a storing condition including storage formats, transmission methods, and storage destinations of reading data (image data). Regarding the reading resolutions, for example, there are 300 dpi and 600 dpi, and regarding the read colors, there are monochrome (grayscale) and colors. Regarding the storage formats, there are a PDF format, a JPEG format, a GIF format, and the like. In addition, regarding the transmission methods, there are a transmission to the host device 100 and a mail transmission, and an address of the storage destination is designated in the storage destination. Also, the setting condition may be configured to be set by a user when the user operates the operating unit 20 of the image reading apparatus 11.

As illustrated in FIG. 5, the image reading apparatus 11 is provided the controller 50 which generally controls these units and conditions. The controller 50 includes a computer 60 constituted by a microprocessor or the like. The computer 60 includes a storage unit 61 storing a program PR or the like which is needed to be executed at the time of a reading-control. Also, the storage unit 61 is constituted by, for example, a nonvolatile memory and a RAM.

In addition, the controller 50 includes an inputting unit 62 constituted by an inputting interface for inputting various data pieces or signals from the host device 100 and an outputting unit 63 constituted by an outputting interface for outputting the reading data read by the image reading apparatus 11 to the host device 100. Further, the controller 50 includes a timing generator 64 (hereinafter, also referred to as "TG 64") which outputs a pulse signal for regulating various timings of operations including an reading-out operation with respect to the image sensors 42A and 42B. In addition, the controller 50 includes an analog front end 65 (hereinafter, also referred to as "AFE 65") which analog/digital-converts (A/D converts) a pixel signal input from the image sensors 42A and 42B.

Figure 7:
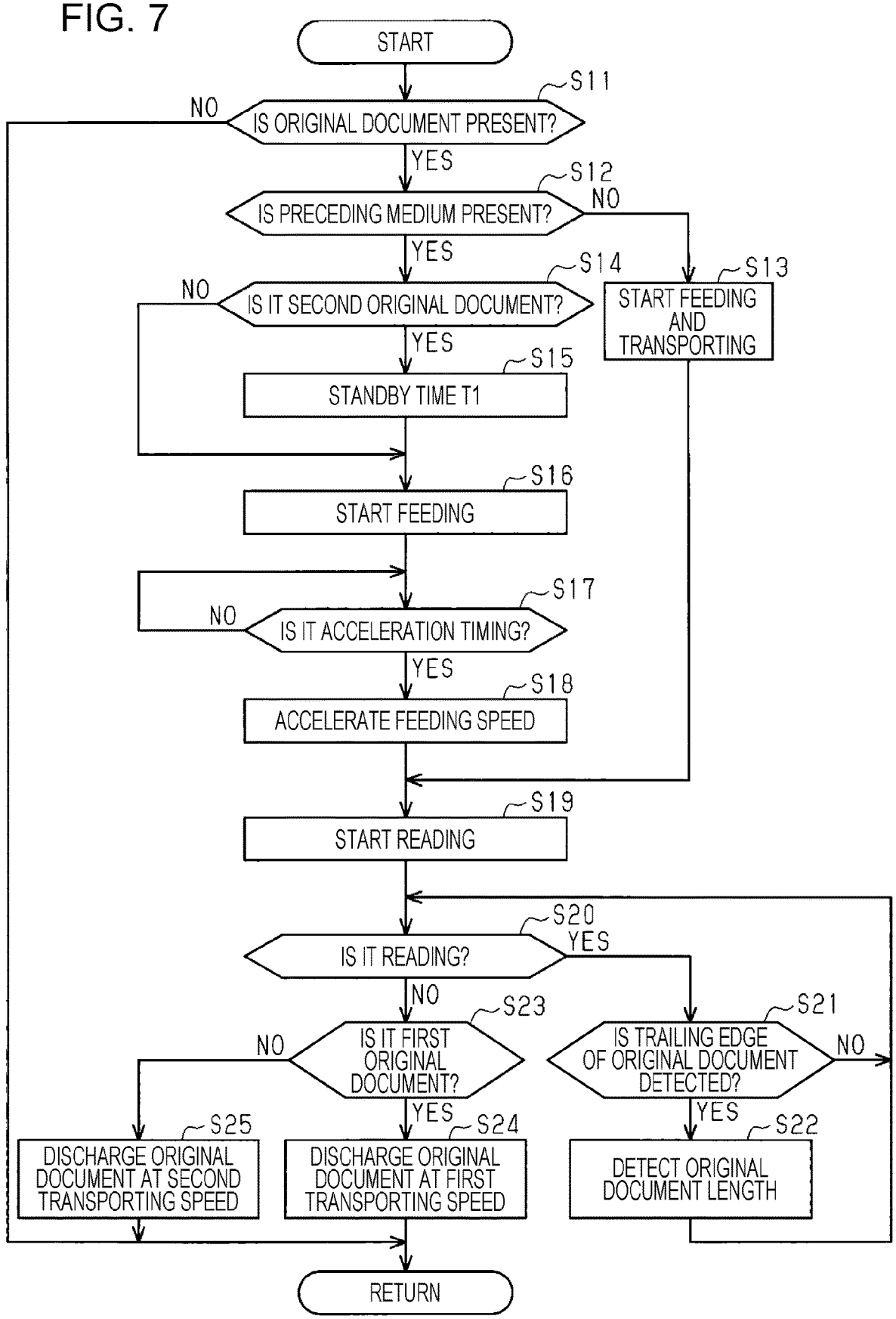
FIG. 7 is a flow chart illustrating an image reading control.

In the storage unit 61 illustrated in FIG. 5, the program PR including a program for reading-control illustrated by a flow chart of FIG. 7 is stored. The computer 60 illustrated in FIG. 5 includes a main control unit 70, a transportation control unit 71, a discrimination unit 72, a reading control unit 73, and an image processing unit 74, as a functional part constituted by software which is configured inside by executing the program PR. The main control unit 70 generally controls the image reading apparatus 11.

The transportation control unit 71 driving-controls the feeding motor 37 and the transporting motor 38 in accordance with an instruction of the main control unit 70. When the feeding roller 33 is rotated by driving the feeding motor 37, the plurality of original documents D set in the original document support 13 is fed into the main body 12 one by one in an order from the lowest original document. In addition, the driving roller 34A constituting one of the pair of the feeding rollers 34 is rotary driven by driving the feeding motor 37, and the separating roller 34B constituting the other thereof is rotary driven by driving the transporting motor 38.

Further, in order to suppress slippage of the feeding roller 33 and the original document D, the transportation control unit 71 initially drives the feeding motor 37 at a low speed, and when the feeding roller 33 is started to be rotated at the low speed, the original document D reaches a predetermined position based on a countable number of values of a counter, and then the transportation control unit increases a rotation speed of the feeding motor 37. In this way, the original document D can be reliably picked up by rotating the feeding roller 33 at a low speed, a time required for the original document D reaching the reading start position of the reading region SA is shortened due to the increase of the feeding speed after that, and thereby making it possible to relatively early set a reading start timing. The original document D is transported to the reading region SA in the middle of the transporting path 29 by the pair of rollers 35 and 36 at the reading speed in accordance with the designated reading resolution (for example, 300 dpi and 600 dpi) in information relating to the reading condition set by a user. For example, the original document D is transported at a high speed in a case in which the reading resolution is relatively low (for example, 300 dpi), and the original document D is transported at a low speed in a case in which the reading resolution is relatively high (for example, 600 dpi). The transportation control unit 71 includes the transportation counter 81. The transportation counter 81 counts the countable number of values corresponding to a transported amount (transported distance) of the original document D based on a reference position of the original document D on the transporting path 29 as an original point. The transportation control unit 71 acquires a position (transporting position) of the original document D on the transporting path 29 from the countable number of values of the transportation counter 81. The transportation control unit 71 acquires a target speed corresponding to the transporting position at that time with reference to feeding profile data set in advance, and speed-controls each of motors 37 and 38 in a transporting system so that an actual speed becomes close to a target speed.

The discrimination unit 72 includes a plurality of counters 82 and 83. A first counter 82 is used for counting a length (transporting length) of the original document D in the transporting direction Y. When the original document presence and absence sensor 48 detects the leading edge of the original document D, a counting process in which the number of pulse edges of the pulse signal input from the encoder 44 is counted is started, and when the original document presence and absence sensor 48 detects the trailing edge of the original document D, the counting process is stopped. In this way, the controller 50 acquires the length of the original document D (original document length L) in the transporting direction Y based on the countable number of values of the first counter 82. The second counter 83 counts the number of pulse edges of the pulse signal input from the encoder 44 and counts various countable numbers of values necessary for reading control. For example, in a case in which the preceding original document Da is in transportation, in order to determine a feeding start timing of the succeeding original document Db so as not to interrupt reading and discharging of the preceding original document Da, the second counter 83 counts the countable number of values waited until the pair of discharging rollers 36 finish to discharge the preceding original document Da. Also, the second counter 83 may be configured to measure a standby time by counting clock signals from a clock circuit (illustration is omitted), for example, the number of pulse edges.

The CS sensor 46 illustrated in FIG. 5 detects the leading edge (downstream end) of a carrier sheet which is not illustrated and the original document D in the transporting direction Y. That is, the image reading apparatus 11 of this example detects the leading edge and the trailing edge of the original document D at different positions from each other on the transporting path 29 by the CS sensor 46 and the original document presence and absence sensor 48. Also, the controller 50 starts a counting process of the second counter 83 based on detecting timings of these sensor, and determines a feeding start timing, a speed increasing timing of the feeding speed, and a timing for changing the reading speed VS at the time of discharging to the transporting speed V1 or V2, based on the countable number of values. Also, the second counter 83 manages a plurality of the timings described above and includes a plurality of counters prepared in each managed target.

The double-feeding sensor 47 of the example receives ultrasonic waves attenuated when the ultrasonic waves emitted from the transmitter pass through the original document D by the receiver, and outputs a detecting signal including a detection value having a size proportional to an amplitude of the attenuated ultrasonic wave. The main control unit 70 stops the reading operation when a double-feeding error is detected based on the detecting signal of the double-feeding sensor 47, and notifies a fact of the double-feeding error to a user by lighting or blinking the notification unit 27 or displaying a message to the display unit 102 of the host device 100. Also, even when the other errors such as a paper jam of the original document D are generated, the main control unit 70 stops the reading operation as needed and notifies the fact of the errors in the same manner.

In addition, the reading control unit 73 includes a TG 64 (timing generator) which outputs the pulse signal for regulating the operation timings of various operations including the reading operation with respect to the image sensor 42 and an AFE 65 (analog front end) which analog/digital-converts (A/D converts) the pixel signal input from the image sensor 42. The reading control unit 73 controls emission of the light source 41 through a light source which is not illustrated and irradiates the reading region of the original document D with light. During the transportation, the reading control unit 73 controls the reading unit 40 through the TG 64 and causes the reading unit 40 to read an image of the original document D. An analog image signal read by reading unit 40 is converted into a digital signal by the AFE 65 and is input to the image processing unit 74.

The image processing unit 74 executes a known correction process such as the shading correction and the gamma correction with respect to the input digital image signal, and generates image data of the original document D. The image data is transmitted to the host device 100 from the image processing unit 74 through the outputting unit 63 through the communication cable (not illustrated).

Figure 6:
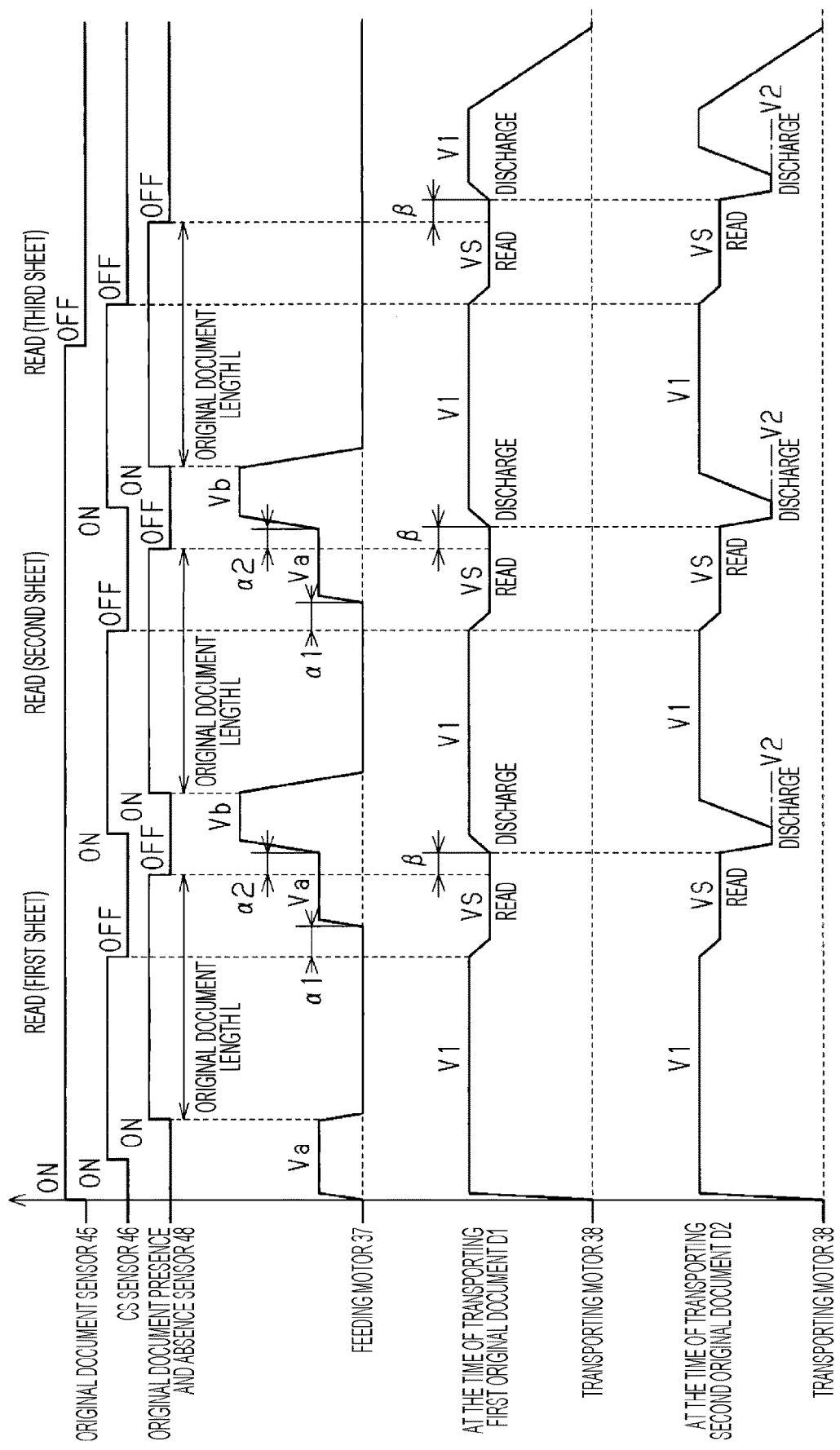
FIG. 6 is a timing flow chart illustrating a transporting control in a reading process of the original document.

Next, with reference to FIG. 6, control contents of the feeding motor 37 and the transporting motor 38 will be described. FIG. 6 illustrates an ON/OFF state of each detecting signal of the original document sensor 45, the CS sensor 46, and the original document presence and absence sensor 48, and speed profiles the feeding motor 37 and the transporting motor 38. Regarding the speed profile of the transporting motor 38, a normal time and a deceleration discharging time are respectively illustrated. The controller 50 (particularly, transportation control unit 71) controls each of motors 37 and 38 based on the detecting signal of each of sensors 45, 46, and 48 and the countable number of values of the counters 81 to 83 (refer to FIG. 5).

The feeding motor 37 starts feeding when the original document sensor 45 is turned on and when the preceding original document Da is absent or is not transported (when the preceding original document is discharged). The feeding speed is set to a low speed in order to suppress slippage of the feeding roller 33 and the original document D. When the leading edge of the supplied original document D is nipped between the pair of transporting rollers 35, and the original document presence and absence sensor 48 is turned on, the feeding motor 37 is stopped to be driven. In addition, when there is the preceding original document Da, the trailing edge of the preceding original document Da passes through the CS sensor 46, and the CS sensor 46 is turned off, and when the second counter 83 counts a predetermined value $\alpha 1$, the feeding motor 37 is started to be driven and is accelerated until reaching a first feeding speed Va. Further, the trailing edge of the preceding original document Da passes through the original document presence and absence sensor 48, then, the original document presence and absence sensor 48 is turned off, and the driving speed of the feeding motor 37 is accelerated so as to be increased from the first feeding speed Va to a second feeding speed Vb when the second counter 83 counts a predetermined value $\alpha 2$.

In the embodiment, a control for changing the discharging speed (transporting speed) when the original document D according to the length of the original document D in the transporting direction, that is, the original document size, is discharged to the stacker 15 is performed. In a normal time (normal mode), in a case in which the original document D is the first original document D1, the first original document D1 which is finished to be read is discharged at the first transporting speed V1. In a deceleration discharging time (deceleration discharging mode), in a case in which the original document D is the second original document D2 longer than the first original document D1, the second original document D2 which is finished to be read is discharged at the second transporting speed V2 slower than the first transporting speed V1 (V1>V2). Here, when the original document presence and absence sensor 48 is turned off, and the second counter 83 counts a predetermined value $\beta$, the controller 50 determines that the reading unit 40 is finished to be read, changes the driving speed of the transporting motor 38, switches the transporting speed of the original document D from the reading speed VS to the transporting speed V1 or V2 at the time of discharging the original document according to the measured length (original document length L) of the original document D. Also, in FIG. 6, the transported distance of the original document D, when the original document presence and absence sensor 48 is turned on and then is turned off, corresponds to the original document length L which is a length of the original document D in the transporting direction Y indicated as the countable number of values counted by the first counter 82. In addition, in FIG. 6, regarding the original document D which is transported in a state of being nipped between the pair of the feeding rollers 34, the pair of transporting rollers 35, and the pair of discharging rollers 36 while being read, if the trailing edge thereof is separated from the pair of the feeding rollers 34 while being transported, then, transportation of the original document by the pair of transporting rollers 35 and the pair of discharging rollers 36 is switched. The reading speed of the original document D at the time of being switched is decelerated to the reading speed VS slightly slower than the first transporting speed V1. This is because the pair of the feeding rollers 34 is rotated at a speed slightly lower than the pairs of rollers 35 and 36 in a transportation system, a load due to the pair of the feeding rollers 34 disappears, and thus changing of the reading speed relatively to a high speed is suppressed.

Next, an action of the image reading apparatus 11 will be described. A user sets the original document D by loading the original document in the original document support 13 when the image reading apparatus 11 is used for reading the original document D. The user performs an operation of setting the reading condition as needed after setting the original document D, and then, instructs the image reading apparatus 11 to read the original document by pressing a start switch 22 of the image reading apparatus 11 or operating the inputting unit 101 of the host device 100.

The computer 60 inside the image reading apparatus 11 executes the program PR including a flow chart illustrated in FIG. 7 when receiving an instruction of starting scan for starting reading of the original document D. Hereinafter, a reading control routine to be performed by the computer 60 will be described with reference to the flow chart illustrated in FIG. 7.

First, in Step S11, the controller 50 determines whether or not it is an original document. If it is the original document, a process proceeds to Step S12, but if it is not the original document (that is, if there is no original document), a routine thereof is finished.

In Step S12, the controller 50 determines whether or not there is the preceding original document. If there is the preceding original document, the process proceeds to Step S13, but if there is no preceding original document, the process proceeds to Step S14.

In Step S13, the controller 50 starts feeding and transporting. If there is no the preceding original document Da (that is, if it is a first sheet), the controller starts to feed and transport any one of the first to the third original documents D1 to D3. That is, the controller 50 starts to drive the feeding motor 37 and the transporting motor 38 and starts to feed the first sheet of the original document D by rotary driving each of the rollers 33, 34A, 35A, and 36A.

In Step S14, the controller 50 determines whether or not the preceding original document is the second original document. If the preceding original document Da is the second original document D2, the process proceeds to Step S15, but if the preceding original document is not the second original document D2, the process proceeds to Step S16. Therefore, if the preceding original document Da is the second original document D2 longer than the first original document D1, the process proceeds to Step S15, and in a case in which the preceding original document is the first original document D1 or the third original document D3 shorter than the first original document D1, the process proceeds to Step S16.

In Step S15, the controller 50 waits until a standby time elapses. Here, after the second original document D2, which is the preceding original document Da, passes through the discharging unit 32 (pair of discharging rollers 36), the controller 50 increases the speed of the transporting unit 31 and the discharging unit 32 to the first transporting speed V1, which corresponds to the reading speed caused when the reading unit 40 reads a subsequent succeeding original document Db, from the second transporting speed V2 at the time of discharging the second original document D2. Also, the controller 50 controls the feeding start timing of the succeeding original document Db so as to start to read the succeeding original document Db, after the speed of the transporting unit 31 and the discharging unit 32 reach the first transporting speed V1 corresponding to the reading speed. That is, in a case in which the preceding original document Da is the second original document D2, compared to a case in which the preceding original document Da is the first original document D1, as a starting speed, when the speed of the transporting motor 38 is increased from the driving speed at the time of discharging the preceding original document Da, is delayed, the feeding start timing of the succeeding original document Db is delayed. In order to delay the feeding start timing of the succeeding original document Db, the controller 50 waits for a standby time T1 to elapse.

In the example, as illustrated in FIG. 6, the countable number of values of the second counter 83 reach the predetermined value $\alpha 1$, and thus the succeeding original document Db is started to be fed. The predetermined value $\alpha 1$ is set to be greater than that in a case of the first original document D1 when the preceding original document Da is the second original document D2, and a difference of the predetermined values al generated due to a different of the original document sizes corresponds to the standby time T1. Therefore, a value of the predetermined value $\alpha 1$ for determining the feeding start timing of the succeeding original document Db is adjusted in accordance with the original document length L (for example, original document size) of the preceding original document Da. Also, the standby time T1 is set to a constant value, but the standby time T1 may be changed in accordance with the length of the original document belong to the second original document D2.

In Step S16, the controller 50 starts feeding. Accordingly, in a case in which the preceding original document Da is the first original document D1 or the third original document D3, the feeding of the original document is started at a timing when the countable number of values of the second counter 83 reaches the predetermined value $\alpha 1$ (refer to FIG. 6). With respect to that, in a case in which the preceding original document Da is the second original document D2, the feeding thereof is started at a timing when the countable number of values of the second counter 83 reaches the predetermined value $\alpha 1$ which is set to a value greater than that in a case of the first original document D1. As a result, in a case in which the preceding original document Da is the second original document D2, a subsequent succeeding original document Db is started to be fed by being delayed for the standby time T1 longer than that in a case of the first original document D1. Therefore, the feeding start timing of the succeeding original document Db is delayed by the standby time T1 in a case of the second original document D2, compared to a case in which the preceding original document Da is the first original document D1. The controller 50 firstly feeds the succeeding original document Db which is started to be fed at the first feeding speed Va.

In Step S17, the controller 50 determines whether or not the feeding speed reaches an acceleration timing. For further information, the controller 50 determines whether or not the feeding speed reaches the acceleration timing for accelerating the speed from the first feeding speed Va to the second feeding speed Vb when the countable number of values of the second counter 83 reaches the predetermined value $\alpha 2$ (refer to FIG. 6). The controller 50 waits until the feeding speed reaches the acceleration timing if it is not, and if the feeding speed reaches the acceleration timing, the process proceeds to Step S18. Here, compared to a case in which the preceding original document Da is the first original document D1, the predetermined value $\alpha 2$ is set to a greater value in a case in which the preceding original document Da is the second original document D2. In this way, in a case in which the preceding original document Da is the second original document D2, compared to a case of the first original document D1, the acceleration timing for accelerating the succeeding original document Db from the first feeding speed Va to the second feeding speed Vb is delayed. Therefore, even when the transporting speed at the time of discharging the original document in a case in which the preceding original document Da is the second original document D2 is decelerated to the second transporting speed V2 slower than the first transporting speed V1, it is possible to suppress generation of an excessive speed difference between the feeding unit 30A and the transporting unit 31 in a feeding process of the succeeding original document Db and to smoothly deliver the succeeding original document Db from the feeding unit 30A to the transporting unit 31.

In Step S18, the controller 50 accelerates the feeding speed. That is, when the feeding speed reaches the acceleration timing, the controller 50 accelerates the feeding speed of the succeeding original document Db from the first feeding speed Va to the second feeding speed Vb. As a result, the succeeding original document Db is fed at the second feeding speed Vb, which is a high speed, and can be started to be read initially. In addition, until then, the succeeding original document Db is fed at the first feeding speed Va which is a low speed, and thus it is possible to suppress slippage of the feeding roller 33 and the original document D and to reliably send the original document D by the feeding roller 33.

In Step S19, the controller 50 starts to read the original document using the reading unit. For further information, the controller 50 starts to instruct the reading control unit 73 to perform reading using the reading unit 40, when the transporting position of the original document D, which is grasped based on the countable number of values of the transportation counter 81 for starting counting since the leading edge of the original document D is detected by the original document presence and absence sensor 48, reaches the reading start position. The reading control unit 73 starts the image sensor 42 constituting the reading unit 40 to read the original document D through the TG 64, and the image sensor 42 outputs a digital reading signal of which a reading signal is amplified and A/D converted by the AFE 65 to the image processing unit 74. The image processing unit 74 executes an image process based on the input reading signal so as to generate image data.

In Step S20, the controller 50 determines whether or not the original document is reading. For further information, the controller 50 determines whether or not the countable number of values of the second counter 83, which is started to be counted at the time of detecting the trailing edge of the preceding original document Da by the original document presence and absence sensor 48, reaches the predetermined value β (refer to FIG. 6). Also, the controller 50 determines that reading is performed if the countable number of values of the second counter 83 does not reach the predetermined value β, but if the countable number of values reaches the predetermined value β, the controller determines that the reading is finished. If the reading is performed, the process proceeds to Step S21, but if the reading is finished so as not to be performed, the process proceeds to Step S23.

In Step S21, the controller 50 determines whether or not the trailing edge of the original document is detected. If the trailing edge of the original document is not detected, the process returns to Step S20, but if the trailing edge of the original document is detected, the process proceeds to Step S22. Here, since the original document presence and absence sensor 48 is positioned on an upstream side of the reading unit 40 in the transporting direction Y, the original document presence and absence sensor detects the trailing edge of the original document D while being read, and the process proceeds to Step S22.

In Step S22, the controller 50 detects the original document length. The controller 50 starts the first counter 82 to count numbers when the leading edge of the original document D is detected by the original document presence and absence sensor 48, and when the original document presence and absence sensor 48 detects the trailing edge of the original document D, the original document length L is acquired based on the countable number of values of the first counter 82 at this time.

In Step S23, the controller 50 determines whether or not the original document is the first original document. That is, the controller 50 (in detail, discrimination unit 72) determines whether or not the original document is the first original document D1 based on the original document length L. Here, the first original document D1 is, for example, an original document within a first size range including a A4 size, the second original document D2 is, for example, an original document within a second size range including a A3 size, and the third original document D3 is, for example, an original document within a third size range less than a A5 size. However, in the example, since the types of the original document are distinguished by the original document length L in the transporting direction Y, even in the same original document size, the types of the original documents are determined to be different types from each other depending on an aspect of setting of the original document. Using the controller 50, if the original document D is the first original document D1, the process proceeds to Step S24, but if the original document D is not the first original document D1, that is, the second original document D2 or the third original document D3, the process proceeds to Step S25.

In Step S24, the controller 50 discharges the original document at the first transporting speed. For further information, when the controller 50 grasps that the first original document D1 is transported to a final position for reading, and the original document is finished to be read D by the reading unit 40 based on the countable number of values of the second counter 83 reaching the predetermined value β, the controller increases the rotation speed of the transporting motor 38. Accordingly, the controller 50 increases the transporting speed of the first original document D1 from the reading speed VS to the first transporting speed V1 and discharges the first original document D1 at the first transporting speed V1 by the discharging unit 32 (pair of rollers 36).

In Step S25, the controller 50 discharges the second original document or the third original document at the second transporting speed. For further information, the controller 50 grasps that the original document D is transported to a final position for reading and the reading of the original document D by the reading unit 40 is finished as the countable number of values of the second counter 83 reaching the predetermined value β, the controller decelerates the rotation speed of the transporting motor 38. Accordingly, the controller 50 decelerates the transporting speeds of the second original document D2 or the third original document D3 from the reading speed VS to the second transporting speed V2 (<V1), and discharges the second original document D2 or the third original document D3 at the second transporting speed V2 by the discharging unit 32 (pair of rollers 36).

Thus, whenever reading of each of the original documents D is completed, a routine thereof is temporarily finished. The controller 50 starts the routine again when the original document sensor 45 detects the succeeding original document Db, and starts from the process in Step S11 with respect to the succeeding original document Db. That is, the controller 50 executes the processes of Step S11, S12, and S14 to S25 which are processes with respect to the original documents D subsequent to a second sheet thereof. Also, when reading of all the original documents D is completed, and the original document sensor 45 does not detect the succeeding original document Db, a reading control based on a received reading job is finished.

As a result of the reading control, as illustrated in FIG. 3, the first original document D1 is discharged at the first transporting speed V1, which is a relatively high speed, onto the stacker 15 and is loaded in an arranged state by coming into contact with the distal end thereof the stopper 15A. In addition, in a case in which the third original document D3 illustrated by a two-dot chain line in FIG. 3 is mixed, if the third original document D3 is discharged at the first transporting speed V1 in the same manner as the first original document D1, the leading edge comes into contact with the stopper 15A and bounced due to a force at the time of discharging, and thus there is deviation in the discharging direction Y1 at a placing position of the third original document D3 on the stacker 15. With respect to that, in the embodiment, since the third original document D3 is discharged at the second transporting speed V2 slower than the first transporting speed, the third original document is loaded at a position near an upstream side on the stacker 15 in an aligned state.

In addition, as illustrated in FIG. 4, the second original document D2 is loaded in a relatively arrayed state at the second transporting speed V2, which is a relatively low speed, in a state in which the stopper 15A is tilted at the retraction position and a state in which the leading edge of the original document on the stacker 15, which extends by the maximum length, is dropped from the distal end of the stacker 15. As seen from the above, regardless of a difference of the original document length L, the original document D having any size is also loaded on the stacker 15 in the arrayed state after being read.

Hitherto, according to the embodiment described above, effects to be described as follows can be obtained.

(1) The image reading apparatus 11 includes the transporting unit 31 that transports the original document, the reading unit 40 that reads an image of the original document, the measuring unit 49 that detects a length of the original document, the discharging unit 32 that discharges the original document after being read by the reading unit, the stacker 15 that receives the discharged original document, and the controller 50 that controls the transporting unit 31 and the discharging unit 32. The controller 50 causes a first original document D1 to be discharged at the first transporting speed V1 when the original document D specified from the length of the original document measured by the measuring unit 49 is the first original document D1, and causes a second original document D2 to be discharged at the second transporting speed V2 slower than the first transporting speed V1 when the original document is the second original document D2 longer than the first original document D1. Accordingly, the first original document D1 is discharged to the stacker 15 at the first transporting speed V1, and the second original document D2 longer than the first original document D1 is discharged to the stacker 15 at the second transporting speed V2 slower than the first transporting speed V1. As a result, it is possible to improve array properties of the original document D discharged to the stacker 15.

(2) The controller 50 causes the second original document D2 to be transported at the reading speed (V1 or VS) while the reading unit 40 reads the second original document D2 in a case in which the original document D is the second original document D2 based on the measured result of the measuring unit 49, and decelerates the transporting speed of the second original document D2 from the reading speed VS to the second transporting speed V2 when the reading unit 40 completes the reading. Accordingly, the second original document D2 is finished to be read at an appropriate reading speed in the same manner as the first original document D1, and thus it is possible to discharge the original document in a state of being arrayed on the stacker 15.

(3) The transporting unit 31 and the discharging unit 32 include the transporting motor 38 as a common power source. In a case in which the preceding original document Da which is precedently fed is the second original document D2, after the second original document D2 passes through the discharging unit 32, the controller 50 increases the speed of the transporting unit 31 and the discharging unit 32. Also, after the speed of the transporting unit 31 and the discharging unit 32 reaches the first transporting speed V1 corresponding to the reading speed caused when the reading unit 40 reads the original document D, from the second transporting speed V2 when the second original document D2 is discharged, the controller controls the feeding start timing of the succeeding original document Db so that the succeeding original document Db which is fed subsequent to the preceding original document Da is started to be read. Accordingly, in a case in which the preceding original document Da is the second original document D2, after the second original document D2 passes through the discharging unit 32, the speed of the transporting unit 31 and the discharging unit 32 are increased. Also, because of the increased speed, after the speed reaches the first transporting speed V1 corresponding to the reading speed caused when the reading unit 40 reads the original document D from the second transporting speed V2 when the second original document D2 is discharged, the feeding start timing of the succeeding original document Db is controlled so that the succeeding original document Db is started to be read. That is, in a case in which the preceding original document Da is the second original document D2, the feeding start timing of the succeeding original document Db is delayed, as the starting speed caused when the speed of the transporting motor 38 is increased from the driving speed at the time of discharging the preceding original document Da is delayed, compared to a case in which the preceding original document Da is the first original document D1. Therefore, even in a case in which the preceding original document Da is the second original document D2 and the discharging speed thereof is delayed, it is possible to start to read the succeeding original document Db at the first transporting speed V1 which is an appropriate reading speed faster than the second transporting speed V2 by the reading unit 40.

(4) In a case in which the preceding original document Da is the second original document D2, the controller 50 delays the feeding start timing of the succeeding original document Db, compared to a case in which the preceding original document Da is the first original document D1. For further information, in a case in which the preceding original document Da is the second original document D2, the controller 50 sets the predetermined value al, to which the countable number of values of the second counter 83 for determining the feeding start timing of the succeeding original document Db reaches, to be greater than that in a case in which the preceding original document Da is the second original document D2 but not the first original document D1. Accordingly, in a case in which the preceding original document Da is the second original document D2, compared to a case of the first original document D1, the controller 50 delays the feeding start timing of the succeeding original document Db by the standby time T1. Accordingly, even when the transporting speed at the time of discharging the original document in a case in which the preceding original document Da is the second original document D2 is set to be delayed to the second transporting speed V2 slower than the first transporting speed V1, it is possible to start to read the succeeding original document Db at an appropriate reading speed. Therefore, regardless whether or not the preceding original document Da is the first original document D1 or the second original document D2, it is possible to start to read the succeeding original document Db at the first transporting speed V1 which is an appropriate reading speed.

(5) The feeding unit 30A that feeds and delivers the original document D to the transporting unit 31 is further included. The controller 50 controls the feeding unit 30A, and accelerates the speed thereof from the first feeding speed Va to the second feeding speed Vb after the original document D is fed at the first feeding speed Va. In a case in which the preceding original document Da is the second original document D2, compared to a case in which the preceding original document Da is the first original document D1, the acceleration timing for accelerating the succeeding original document Db from the first feeding speed Va to the second feeding speed Vb is delayed. For further information, in a case in which the preceding original document Da is the second original document D2, the predetermined value α2, to which the countable number of values of the second counter 83 for determining an acceleration start timing reaches, is set to be greater than that in a case of the first original document D1. Accordingly, in a case in which the preceding original document Da is the second original document D2, even when the transporting speed at the time of discharging the second original document D2 is set to the second transporting speed V2 slower than the first transporting speed V1, a speed difference between the transporting unit 31 having a common power source to the discharging unit 32 and the feeding unit 30A is avoided to be excessive, and thus it is possible to smoothly deliver the succeeding original document Db from the feeding unit 30A to the transporting unit 31.

(6) When the original document D is the third original document D3 having a length shorter than that of the first original document D1, the controller 50 discharges the third original document D3 at the second transporting speed V2. Accordingly, when the original document D specified from the length of the original document D measured by the measuring unit 49 is the third original document D3 having a length shorter than the first original document D1, the original document is discharged at the second transporting speed V2 in the same manner as the second original document D2. As a result, it is possible to load the third original document D3 on the stacker 15 with good array properties. For example, in a case in which the length of the stacker 15 can be adjusted, even when the length of the stacker 15 matches with the length of the first original document D1 in a case in which the plurality of original documents D in which the first original document D1 and the third original document D3 are mixed is read, it is possible to load the third original document D3 on the stacker 15 with the first original document D1 in an arrayed state.

(7) The stacker 15 includes the placing unit 15C in which a length can be adjusted within a predetermined length range where the length of the original document D in the discharging direction Y1 is longer than that of the first original document D1 and is shorter than that of the second original document D2, and the stopper 15A provided on the leading edge of the original document D in the discharging direction Y1 in the placing unit 15C. The stopper 15A is provided to be movable at the regulation position and the retraction position, and comes into contact with the leading edge of the original document D in the discharging direction Y1 at the regulation position so that a further movement of the original document D in the discharging direction Y1 is regulated. Accordingly, when the original document D is the second original document D2, the original document is discharged at the second transporting speed V2 slower than the first transporting speed V1 in a case of the first original document D1 by the discharging unit 32. The second original document D2 longer than the first original document D1 is discharged onto the stacker 15 in a state in which the leading edge exceeds the stopper 15A of the stacker 15 so as to be dropped. At this time, since the second original document D2 is discharged at the second transporting speed V2 slower than the first transporting speed V1, it is possible to array and load the original document in a state of being dropped from the distal end of the stacker 15. It is possible to efficiently suppress falling of the second original document D2 from the distal end of the stacker 15.

(8) The controller 50 detects the length of each of the original documents D in a reading job of reading the plurality of original documents D, and switches the transporting speed caused when the discharging unit 32 discharges the original document D between the first transporting speed V1 and the second transporting speed V2 in accordance with the length of the original document D in each original document D. Accordingly, when the plurality of original documents D is read, the length of the original document D is measured one by one, and since the transporting speed at the time of discharging the original document in each original document D is adjusted in accordance with the length of the original document D, for example, even when the plurality of original documents D having different original document lengths is mixed, the plurality of original documents D is read, and then it is possible to load the plurality of original documents D on the stacker 15 with good array properties.

(9) The image reading apparatus 11 further includes the feeding unit 30A on which the plurality of original documents D is placed, and the feeding unit 30A feeds the plurality of original documents D in order from the lowest placed original document one by one. Also, the original document D after being read is discharged from the discharging port 12B positioned on a lower stream side in the transporting direction Y with respect to the feeding port 12A in the same manner as at the time of feeding while maintaining a front and a rear side as it is. Accordingly, the plurality of original documents D set in the original document support 13 constituting the feeding unit 30A can be loaded on the stacker 15 after being read in the same order as at the time of setting.

The embodiment described above may be modified as a modification example to be described later. A configuration included in the embodiment and a configuration included in the modification example described below may be arbitrary combined, or configurations included in the modification example described below may be arbitrary combined with each other.

As illustrated in FIG. 5, a stacker motor 91 is provided as a power source capable of supplying a power for adjusting the length of the stacker 15 in the discharging direction Y1 illustrated by a two-dot chain line in the drawing. The controller 50 changes the length of the stacker 15 measured by the measuring unit 49 in accordance with the length of the original document D. For further information, the image reading apparatus 11 includes a stacker sensor (illustration is omitted) which detects the length of the stacker 15, and the controller 50 determines whether or not the length of the stacker 15 in the discharging direction Y1 grasped based on a detected result of the stacker sensor matches with the length of the original document D measured by the measuring unit 49. If the length of the stacker 15 does not match with the length of the original document D, the controller 50 drives the stacker motor 91 so as to adjust the length of the stacker 15 to a length matching with the length of the original document D at that time. Accordingly, the length of the stacker 15 is changed in accordance with the length of the original document D. Therefore, it is possible to discharge the original document D in a state of being arrayed on the stacker 15 regardless of the size thereof. For example, it is possible to suppress falling of the second original document D2 from the distal end of the stacker 15.

As illustrated in FIG. 5, a stopper sensor 92 illustrated by a two-dot chain line in the drawing, which determines whether or not the stopper 15A provided at the distal end portion of the stacker 15 is disposed at the regulation position or at the retraction position, is provided. When the stopper sensor 92 detects the stopper 15A to be positioned at the regulation position, and the measuring unit 49 detects the second original document D2, the controller 50 stops reading of the second original document D2, and causes the notification unit 27, which is capable of notifying a user with a display or a voice, to notify a user of a message for urging the stopper 15A to move to the retraction position. In addition, when the stopper sensor 92 detects the stopper 15A to be positioned at the retraction position, and the measuring unit 49 detects the first original document D1, the controller 50 stops reading of the first original document D1, and causes the notification unit 27, which is capable of notifying a user with a display or a voice, to notify a user of a message for urging the stopper 15A to move to the regulation position. In these cases, only in a case in which the measuring unit 49 detects the second original document D2, the reading and notification may be stopped. Further, in these cases, the original document D may be stopped or the notification of the notification unit 27 may be performed. In addition, the notification unit 27 preferably notifies a user of the message with characters using the display unit such as a liquid crystal panel. In addition, the notification unit may be a speaker which notifies a message with a voice. According to the configuration, in a case in which the stopper 15A is not disposed at an appropriate position (including posture) in accordance with the length of the original document D, the reading of the original document is stopped, and the notification unit 27 notifies a user of a message for urging the stopper 15A to move to a position in accordance with the original document length. Accordingly, even though the position of the stopper 15A of the stacker 15 is not appropriated, the original document D is read, and it is possible to avoid a situation where array properties worsen when the original document D is loaded on the stacker 15 before happens.

The power source of the transporting unit 31 and the discharging unit 32 is not limited to a common power source to each other, and the transporting unit 31 and the discharging unit 32 may be respectively driven by a separate power source. For example, the power source of the transporting unit 31 is set to the transporting motor, and the power source of the discharging unit 32 is set to a discharging motor. In a case in which the original document is the second original document D2, a driving speed of the discharging motor may be decelerated so as to discharge the second original document D2 at the second transporting speed V2.

A mounting position of the original document presence and absence sensor 48 constituting the measuring unit 49 may be a position as long as the length of the original document can be measured before the original document D is discharged. For example, a sensor, which is capable of distinguishing and detecting whether or not the length of the original document D set in the feeding unit 30A is the first original document or the second original document, may be used.

The measuring unit is not limited to the sensor, and may detect the length of the original document based on information relating to the original document used for specifying the length of the original document input from the host device 100.

The first original document D1 and the third original document D3 in the embodiment described above may be discharged at different transporting speeds. That is, if the second transporting speed V2 is slower than the first transporting speed V1, the transporting speeds at the time of discharging the first original document and the third original document may be different from each other.

The image sensor is not limited to a CMOS image sensor, for example, and may be a metal oxide semiconductor (MOS) image sensor or a charge coupled device (CCD) image sensor.

The image sensor 42 is not limited to a linear image sensor, and may be an area image sensor.

Each functional unit inside the computer 60 is not limited to software, and for example, may be realized as hardware by an electronic circuit such as a field-programmable gate array (FPGA) or an application specific IC (ASIC), or may be realized by cooperating software and hardware.

A material of the original document is not limited to paper, and may be a resin film or sheet, woven fabric, or a metal film.

The image reading apparatus may be a part of a complex machine including a printing function and a copy function in addition to a scanner function.

The image reading apparatus is not limited to a sheet feeding type, and may be a flat-bed type. In a case of the flat-bed type image reading apparatus, a carriage movable along a sub scanning direction (X direction) is included inside the main body, the carriage moves a motor for scanning as the power source, and an image of the original document, which is set on a glass plate of an original document board, is read by the light source and the reading unit provided in the carriage. Even in this type of the flat-bed type image reading apparatus, as long as an automatic original document feeding device (auto sheet feeder) which automatically feeds the original document is provided, it is possible to load the original document after being read on the stacker in an arrayed state.

The entire disclosure of Japanese Patent Application No. 2017-200456, filed Oct. 16, 2017 is expressly incorporated by reference herein.

What is claimed is:

1. An image reading apparatus comprising:
a feeding unit that feeds an original document in an order from a lowest original document one by one by the feeding unit;
a transporting unit that transports the original document;
a reading unit that reads an image of the original document;
a measuring unit that measures a length of the original document;
a discharging unit that discharges the original document after being read by the reading unit;
a stacker that receives the discharged original document; and
a controller that controls the transporting unit and the discharging unit,
wherein the controller causes a first original document to be discharged at a first transporting speed when the original document being specified from an original document length measured by the measuring unit is the first original document, and causes a second original document to be discharged at a second transporting speed slower than the first transporting speed when the original document is specified the second original document longer than the first original document, and
wherein the controller causes the second original document to be transported at a reading speed while the reading unit reads the second original document in a case in which the original document is the second original document based on a measured result of the measuring unit and decelerates a transporting speed of the second original document to the second transporting speed from the reading speed when reading by the reading unit is completed, wherein the reading speed is equal to the first transporting speed, and
wherein the controller controls the feeding unit and accelerates a feeding speed from a first feeding speed associated with the original document to a second feeding speed, higher than the first feeding speed, to feed the second original document toward the reading unit for at least a portion of a time when the original document is being discharged from the discharging unit, at least a portion of the second original document being read by the reading unit while the original document is discharged by the discharging unit.

2. The image reading apparatus according to claim 1,
wherein the transporting unit and the discharging unit include a common power source, and
wherein, in a case in which a preceding original document which is precedently fed is the second original document, after the second original document passes through the discharging unit, the controller increases the speeds of the transporting unit and the discharging unit, and after the speeds of the transporting unit and the discharging unit reach the reading speed caused when the reading unit reads the original document from the second transporting speed caused when the second original document is discharged, the controller controls a feeding start timing of a succeeding original document so that the succeeding original document which is fed subsequent to the preceding original document is started to be read.

3. The image reading apparatus according to claim 2,
wherein, in a case in which the preceding original document is the second original document, the feeding start timing of the succeeding original document is delayed, compared to a case in which the preceding original document is the first original document.

4. The image reading apparatus according to claim 2, further comprising:
wherein, in a case in which the preceding original document is the second original document, the controller delays an acceleration timing for accelerating the succeeding original document to the second feeding speed from the first feeding speed, compared to a case in which the preceding original document is the first original document.

5. The image reading apparatus according to claim 1,
wherein the controller causes a third original document to be discharged at the second transporting speed, when the original document is specified the third original document having a length shorter than that of the first original document.

6. The image reading apparatus according to claim 1,
wherein the stacker includes a placing unit that is capable of adjusting the length of the original document within a predetermined length range of which the length of the original document in a discharging direction is longer than the first original document and is shorter than the second original document, and a stopper that is provided to be movable to a regulation position and a retraction position in a leading edge of the original document at the placing unit in the discharging direction and regulates further movement of the original document in the discharging direction by coming into contact with the leading edge of the original document in the discharging direction.

7. The image reading apparatus according to claim 1,
wherein the controller detects the length of the original document in each sheet in a reading job for reading a plurality of the original documents, and switches a transporting speed caused when the discharging unit discharges the original document between the first transporting speed and the second transporting speed in accordance with the length of the original document in each the original document.

8. The image reading apparatus according to claim 1, further comprising:
a power source that is capable of supplying a power for adjusting a length of the stacker,
wherein the controller changes the length of the stacker in accordance with the length of the original document measured by the measuring unit.

9. The image reading apparatus according to claim 1, further comprising:
a sensor that detects whether or not the stopper provided in the distal end portion of the stacker is present at the regulation position or the retraction position; and
a notification unit that is capable of performing notification with respect to a user with a display or a voice,
wherein, when the sensor detects whether or not the stopper is present at the regulation position, and the measuring unit detects the second original document, the controller stops reading of the second original document and causes the notification unit to notify a message for urging the stopper to be moved to the retraction position.

10. The image reading apparatus according to claim 1, further comprising:
a feeding unit that is capable of placing a plurality of the original documents, wherein the feeding unit sequentially feeds the original documents from the original document placed on a lower side.

11. The image reading apparatus according to claim 1, wherein the measuring unit is disposed inside the image reading apparatus between the reading unit and a feed tray of the image reading apparatus.

12. The image reading apparatus according to claim 1, wherein the controller is configured to change a length of the stacker in a discharge direction.

13. An image reading apparatus comprising:
a feed tray that loads on a plurality of original documents;
a feeding unit that feeds an original document in an order from a lowest original document one by one by the feeding unit;
a transporting unit that transports the original document;
a reading unit that reads an image of the original document;
a measuring unit that measures a length of the original document, wherein the measuring unit is disposed inside the image reading apparatus between the reading unit and the feed tray of the image reading apparatus;
a discharging unit that discharges the original document after being read by the reading unit;
a stacker that receives the discharged original document; and
a controller that controls the transporting unit and the discharging unit,
wherein the reading unit is disposed between the feed tray and the discharging unit;
wherein the controller causes a first original document to be discharged at a first transporting speed when the original document being specified from an original document length measured by the measuring unit is the first original document, and causes a second original document to be discharged at a second transporting speed slower than the first transporting speed when the original document is specified the second original document longer than the first original document,
wherein the controller causes the second original document to be transported at a reading speed while the reading unit reads the second original document in a case in which the original document is the second original document based on a measured result of the measuring unit and decelerates a transporting speed of the second original document to the second transporting speed from the reading speed when reading by the reading unit is completed, wherein the reading speed is equal to the first transporting speed, and wherein the controller controls the feeding unit and accelerates a feeding speed from a first feeding speed associated with the original document to a second feeding speed, higher than the first feeding speed, to feed the second original document toward the reading unit for at least a portion of a time when the original document is being discharged from the discharging unit, at least a portion of the second original document being read by the reading unit while the original document is discharged by the discharging unit.

14. An image reading apparatus comprising:
a transporting unit that transports an original document;
a reading unit that reads an image of the original document;
a measuring unit that measures a length of the original document;
a discharging unit that discharges the original document at a predetermined discharging speed from a discharge port in a discharging direction after being read by the reading unit;
a stacker that receives the discharged original document;
a stopper that is provided in a distal end portion of the stacker and regulates movement of the discharged original document in the discharging direction by coming into contact with a leading edge of the original document in the discharging direction; and
a controller that controls the transporting unit and the discharging unit,
wherein the controller discharges a first original document after being read by the reading unit, without reducing the predetermined discharged speed, when a length of the first original document measured by the measuring unit is shorter than a length of the stacker, and discharges a second original document after being read by the reading unit by reducing the predetermined discharging speed when a length of the second original document measured by the measuring unit is longer than the length of the stacker.

15. The image reading apparatus according to claim 14, wherein the stacker is provided to be movable to an accommodated position and a used position by a user.

16. The image reading apparatus according to claim 14, wherein the stacker is provided to be able to elongate from an accommodated position.

17. The image reading apparatus according to claim 14, wherein the stopper is provided to be rotatable.

* * * * *